US011828951B2

(12) United States Patent
Kao

(10) Patent No.: US 11,828,951 B2
(45) Date of Patent: Nov. 28, 2023

(54) META-OPTICAL DEVICE FOR LIGHT BEAM COMBINING

(71) Applicant: Wuyun Co., Inc., Taichung (TW)

(72) Inventor: Po-Sung Kao, Taichung (TW)

(73) Assignee: Wuyun Co., Inc., Taichung (TW)

( * ) Notice: Subject to any disclaimer, the term of this patent is extended or adjusted under 35 U.S.C. 154(b) by 84 days.

(21) Appl. No.: 17/565,077

(22) Filed: Dec. 29, 2021

(65) Prior Publication Data

US 2023/0036538 A1 Feb. 2, 2023

(30) Foreign Application Priority Data

Jul. 21, 2021 (TW) .................... 110126861

(51) Int. Cl.
*G02B 1/00* (2006.01)
*G02B 27/10* (2006.01)
*G02B 27/30* (2006.01)

(52) U.S. Cl.
CPC ......... *G02B 27/1006* (2013.01); *G02B 1/002* (2013.01); *G02B 27/30* (2013.01)

(58) Field of Classification Search
CPC .... G02B 27/1006; G02B 27/30; G02B 27/12; G02B 1/002; G02B 27/102; G02B 27/10
See application file for complete search history.

(56) References Cited

U.S. PATENT DOCUMENTS

| 11,086,051 | B2 | 8/2021 | Tsai et al. |
| 2009/0285076 | A1* | 11/2009 | Rothenberg ....... G02B 27/1006 |
| | | | 369/109.01 |
| 2018/0059505 | A1 | 3/2018 | Kyoung et al. |
| 2019/0349569 | A1 | 11/2019 | Wang et al. |
| 2020/0103722 | A1 | 4/2020 | Kim et al. |
| 2021/0028332 | A1* | 1/2021 | Liu .................. G02B 1/005 |

FOREIGN PATENT DOCUMENTS

TW 201821353 A 6/2018

OTHER PUBLICATIONS

Taiwan Search Report dated May 31, 2022 issued in TW Application No. 110126861.

* cited by examiner

*Primary Examiner* — Ryan D Howard
(74) *Attorney, Agent, or Firm* — Blank Rome LLP

(57) ABSTRACT

A meta-optical device for light beam combining is provided to include a substrate and a meta-optical array that is formed on the substrate and that is disposed to receive N number of col-mated light beams. The meta-optical array includes a plurality of nanostructures that are made in such a way that the N number of collimated light beams are deflected to travel in a predetermined direction.

7 Claims, 9 Drawing Sheets

META-OPTICAL DEVICE FOR LIGHT BEAM COMBINING

CROSS-REFERENCE TO RELATED APPLICATION

This application claims priority of Taiwanese Invention Patent Application No. 110126861, filed on Jul. 21, 2021.

FIELD

The disclosure relates to a meta-optical device, and more particularly to a meta-optical device for light beam combining.

BACKGROUND

Traditional optical systems are Generally composed of multiple optical components or curved surfaces that occupy a certain amount of space. In order to make these optical components perform a specific function, the size of the optical system may be large. For example, prisms and lenses that occupy a certain amount of space are required to enable required combination of light beams.

In addition, when a radius of curvature of a curved surface is small, maintaining processing precision would be difficult in view of technical limitations on processing traditional optical components.

SUMMARY

Therefore, an object of the disclosure is to provide a meta-optical device that can be used for light beam combining and that has a reduced size while maintaining good processing precision.

According to the disclosure, the meta-optical device includes a substrate and a meta-optical array. The substrate has a substrate surface that extends in an X-Y plane defined by an X-axis extending in an X-axis direction and a Y-axis extending in a Y-axis direction. X-axis direction and the Y-axis direction are perpendicular to each other. The meta-optical array is formed on the substrate surface, is disposed to receive first to $N^{th}$ light beams, wherein each of the first to $N^{th}$ light beams is a collimated light beam, and N is a positive integer. The meta-optical array includes a plurality of nanostructures that are arranged in an array and that extend in a Z-axis direction in which a Z-axis extends and which is perpendicular to the substrate surface. Each of the nanostructures is configured to satisfy an equation of:

$$\Delta\varphi_n(x, y) = \frac{2\pi}{\lambda_n}(x\cos\theta_n + y\sin\theta_n)\sin\gamma_n,$$

where n is a variable that takes on a positive integer value ranging from 1 to N, X represents a distance between the nanostructure and art origin of the meta-optical array for an $n^{th}$ light beam in the X-axis direction, $\gamma$ represents a distance between the nanostructure and the origin of the meta-optical array for the $n^{th}$ light beam in the Y-axis direction, the origin of the meta-optical array for the $n^{th}$ light beam is defined to be an intersection of an optical axis of the $n^{th}$ light beam and the meta-optical array, $\Delta\varphi_n(x,y)$ represents a difference between a phase shift to be induced on the $n^{th}$ light beam by the nanostructure and a phase shift to be induced on the $n^{th}$ light beam by one of the nanostructures that is located at the origin of the meta-optical array for the $n^{th}$ light beam, $\lambda_n$ represents an operating wavelength of the $n^{th}$ light beam, $\theta_n$ represents an angle between the X-axis and a projection of the $n^{th}$ light beam on the X-Y plane, and $\gamma_n$ represents an angle between the Z-axis and the $n^{th}$ light beam. The $n^{th}$ beam thus deflected by the meta-optical array travels in a predetermined direction.

BRIEF DESCRIPTION OF THE DRAWINGS

Other features and advantages of the disclosure will become apparent in the following detailed description of the embodiment(s) with reference to the accompanying drawings, of which.

Figure 6:
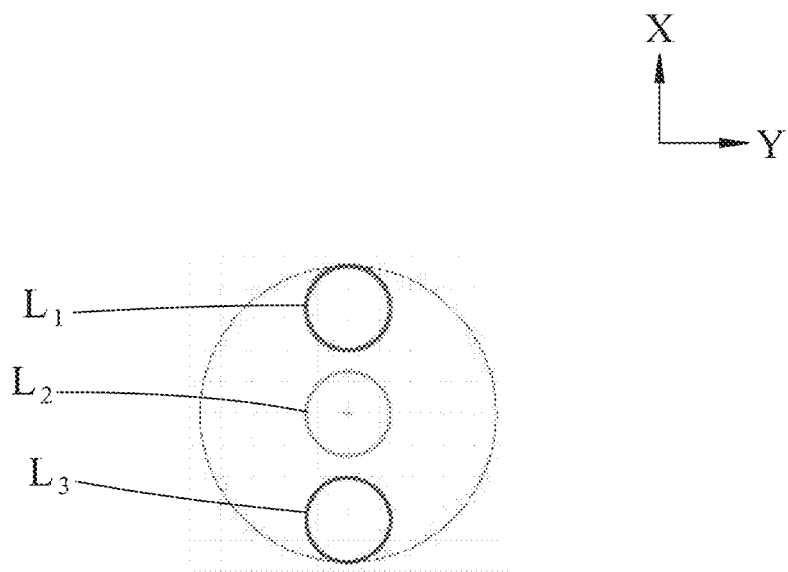
Figure 9:
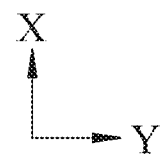
Figure 9:
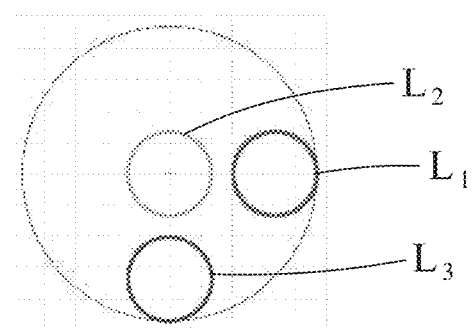
Figure 10:
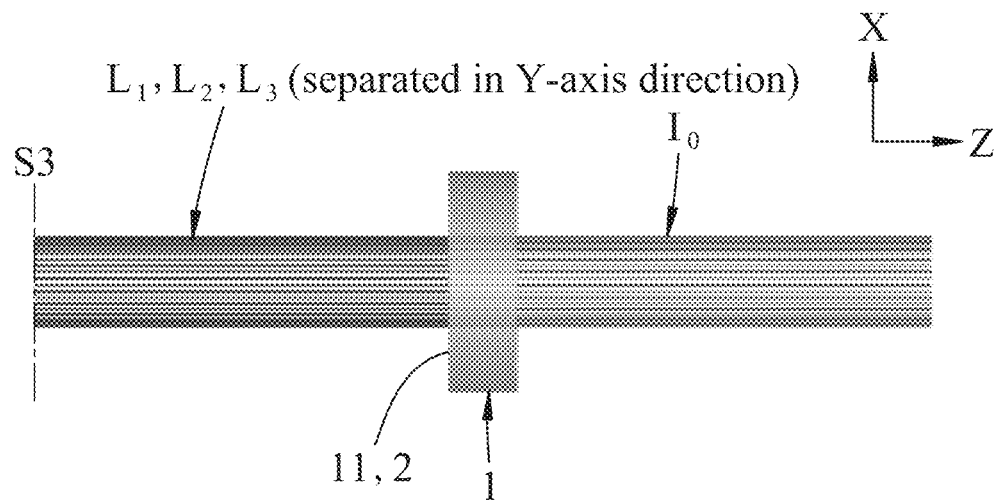
Figure 11:
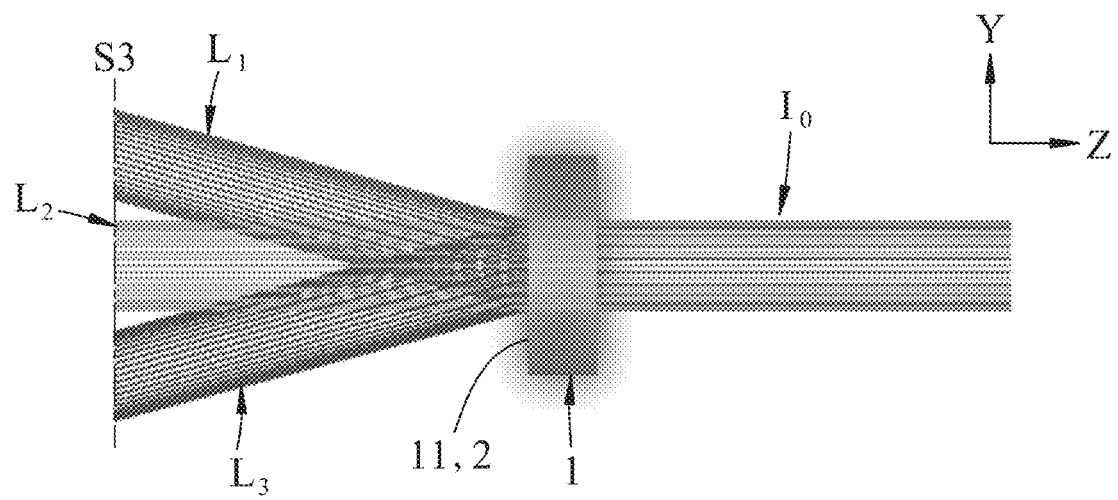
Figure 12:
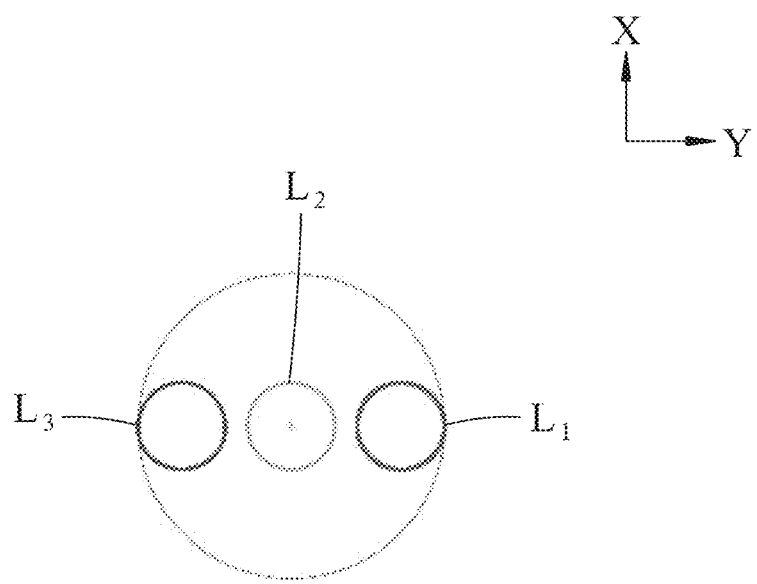

FIGS. and 5 are schematic diagrams showing optical paths of a first simulation experiment that uses the embodiment;

FIG. 6 is a schematic diagram showing a footprint of incident light beams on a plane S1 in the first simulation experiment;

FIGS. and 8 are schematic diagrams showing optical paths of a second simulation experiment that uses the embodiment;

FIG. 9 is a schematic diagram showing a footprint of incident light beams on a plane S2 in the second simulation experiment;

FIGS. 10 and 11 are schematic diagrams showing optical paths of a third simulation experiment that uses the embodiment;

FIG. 12 is a schematic diagram showing a footprint of incident light beams on a plane S3 in the third simulation experiment.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
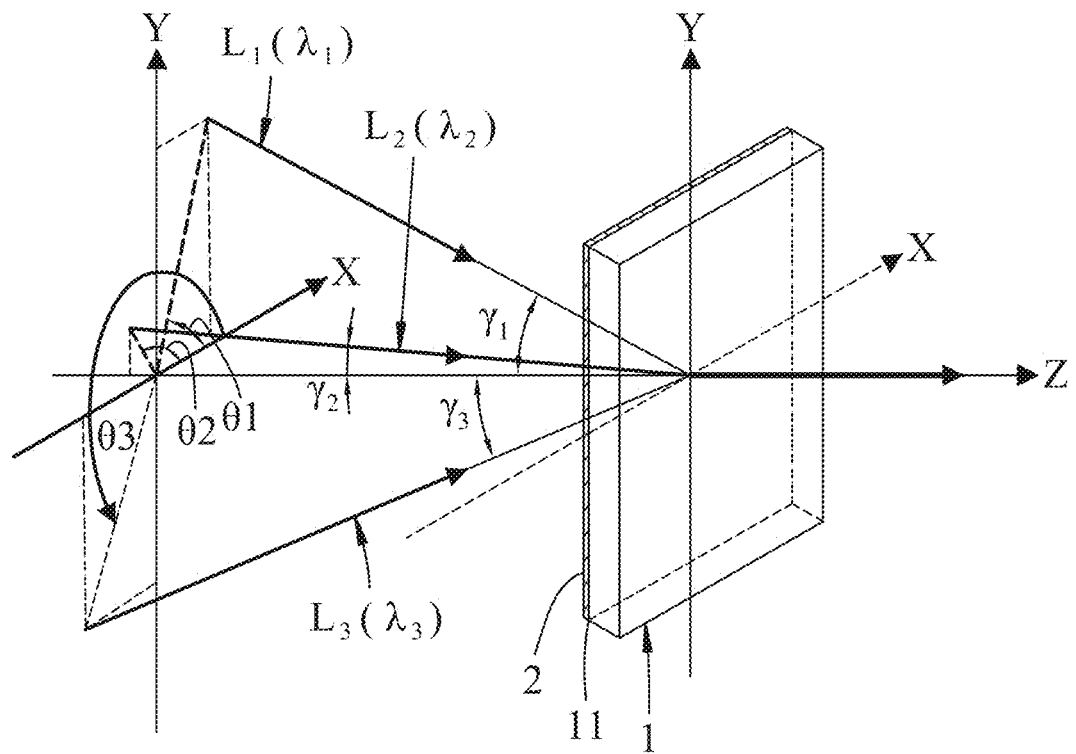
FIG. 1 is a schematic diagram illustrating an embodiment of a meta-optical device according to the disclosure.
Figure 2:
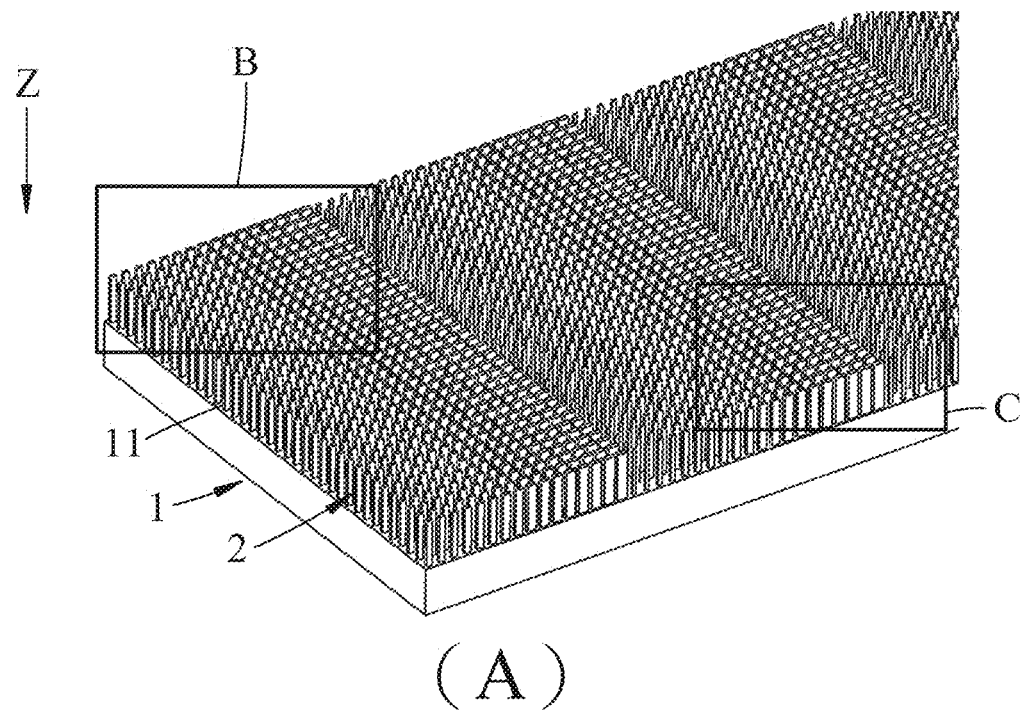
FIG. 2 is a fragmentary perspective view illustrating the embodiment, where part (B) is an enlarged view of a section B in part (A), and part (C) is an enlarged view of a section C in part (A)
Figure 2:
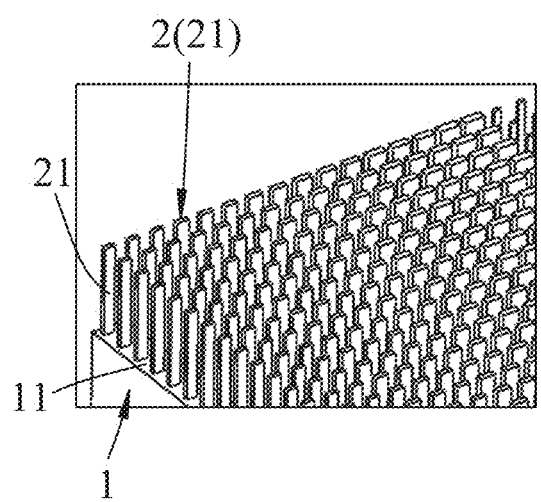
Figure 2:
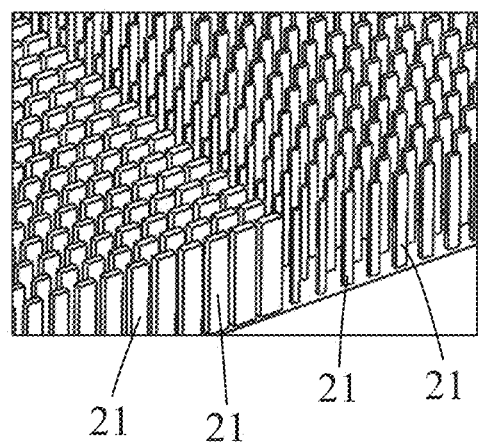

Referring to FIGS. 1 and 2, an embodiment of meta-optical device according to this disclosure is provided for combining N number of collimated light beams (referred to as first to $N^{th}$ light beams hereinafter) into a single imaging light beam, where N is a positive integer. In this embodiment, the meta-optical device may be a lens component used in an optical engine of a projector for deflecting the light beams (e.g., light beams of different colors) to the same travelling direction. In some variations of this embodiment, the meta-optical device may be used in an optical engine for augmented reality (AR) and/or virtual reality (VR), a light combining system for fiber-optic communication, etc.

The meta-optical device includes a substrate 1 and a meta-optical array 2.

The substrate 1 has a substrate surface 11 that extends in an X-Y plane defined by an X-axis extending in an X-axis direction and a Y-axis extending in a Y-axis direction, and is made of $SiO_2$, where the X-axis direction and the Y-axis direction are perpendicular to each other. In other embodiments, the substrate 1 may be made of other materials, such as optical glass, materials that include Si and/or Ge, other suitable materials, or any combination thereof, and this disclosure is not limited in this respect.

The meta-optical array 2 is formed on the substrate surface 11, and is disposed to receive the first to $N^{th}$ light beams. In use, the substrate surface 11 faces light sources (not shown) that emit the first to $N^{th}$ light beams, so the meta-optical array 2 directly receives the first to $N^{th}$ light beams. In this embodiment, N=3, and the meta-optical array 2 receives the first light beam $L_1$, the second light beam $L_2$ and the third light beam $L_3$, as shown in FIG. 1.

In this embodiment, the meta-optical array 2 may be made of $TiO_2$, and the light beams may be, for example but not limited to, visible light, infrared, or light beams of other wavelengths. In other embodiments, the meta-optical array 2 may be made of other materials, such as GaN, GaP, AlAs, AlGaAs, Ge, ZnS, Si, $Si_3N_4$, other transmissive dielectrics having a high refractive index (e.g., greater than 1.8), or any combination thereof, and this disclosure is not limited in this respect.

The meta-optical array 2 includes a plurality of nanostructures 21 that are arranged in an array, and each of the nanostructures 21 extends in a Z-axis direction in which a Z-axis extends that is perpendicular to the substrate surface 11 (i.e., perpendicular to the X-axis direction and the Y-axis direction). When an incident light beam enters a nanostructure 21, the nanostructure 21 induces a phase shift on the incident light beam to output a deflected light beam component that has a phase difference from the incident light beam. Each of the nanostructures 21 is configured to satisfy an equation (1) of:

$$\Delta\varphi_n(x, y) = \frac{2\pi}{\lambda_n}(x\cos\theta_n + y\sin\theta_n)\sin\gamma_n,$$

where n is a variable that takes on a positive integer value ranging from 1 to N, X represents a distance between the nanostructure 21 and an origin (0,0) of the meta-optical array 2 for an $n^{th}$ light beam in the X-axis direction, $\gamma$ represents a distance between the nanostructure 21 and the origin of the meta-optical array 2 for the $n^{th}$ light beam in the Y-axis direction, the origin of the meta-optical array for the $n^{th}$ light beam is defined to be an intersection of an optical axis of the $n^{th}$ light beam and the meta-optical array 2, $\Delta\varphi_n(x,y)$ represents a difference between a phase shift to be induced on the $n^{th}$ light beam by the nanostructure 21 at coordinates (x,y) and a phase shift to be induced on the $n^{th}$ light beam by one of the nanostructures 21 that is located at the origin (0, 0) of the meta-optical array 2 for the $n^{th}$ light beam (hereinafter shortened to "the nanostructure 21 at the $n^{th}$ origin") (thus, $\Delta\varphi_n(0,0)=0$), $\lambda_n$ represents an operating wavelength of the $n^{th}$ light beam, $\theta_n$ represents an angle between the X-axis and a projection of the $n^{th}$ light beam on the K-Y plane, and $\gamma_n$ represents an angle between the Z-axis and the $n^{th}$ light beam. In this embodiment, the optical axes of the first to $N^{th}$ light beams may intersect each other on the substrate surface 11 of the meta-optical array 2, so the origins for the first to $N^{th}$ light beams all coincide, but this disclosure is not limited in this respect.

Since this embodiment includes three light beams $L_1$, $L_2$, $L_3$ and one meta-optical array 2, each of the nanostructures of the meta-optical array 2 is configured to satisfy three equations (1-1), (1-2), (1-3) as follows:

$$\Delta\varphi_1(x, y) = \frac{2\pi}{\lambda_1}(x\cos\theta_1 + y\sin\theta_1)\sin\gamma_1 \quad (1-1)$$

$$\Delta\varphi_2(x, y) = \frac{2\pi}{\lambda_2}(x\cos\theta_2 + y\sin\theta_2)\sin\gamma_2 \quad (1-2)$$

$$\Delta\varphi_3(x, y) = \frac{2\pi}{\lambda_3}(x\cos\theta_3 + y\sin\theta_3)\sin\gamma_3, \quad (1-3)$$

where X represents a distance between the nanostructure 21 and the origin of the meta-optical array 2 for the first light beam $L_1$ in the X-axis direction, $\gamma$ represents a distance between the nanostructure 21 and the origin of the meta-optical array 2 for the first light beam $L_1$ in the Y-axis direction, $\Delta\varphi_1(x,y)$ represents a difference between a phase shift to be induced on the first light, beam $L_1$ by the nanostructure 21 at coordinates (X,y) and a phase shift to be induced on the first light beam $L_1$ by the nanostructure 21 at the origin (0,0) of the meta-optical array 2 for the first light beam $L_1$ (thus, $\Delta\varphi_1(0,0)=0$), $\lambda_1$ represents an operating wavelength of the first light beam $L_1$, $\theta_1$ represents an angle between the X-axis and a projection of the first light beam $L_1$ on the X-Y plane, $\gamma_1$ represents an angle between the Z-axis and the first light beam $L_1$, $\Delta\varphi_2(x,y)$ represents a difference between a phase shift to be induced on the second light beam $L_2$ by the nanostructure 21 at coordinates (X,y) and a phase shift to be induced on the second light beam $L_2$ by the nanostructure 21 at the origin (0,0) for the second light beam $L_2$ (thus, $\Delta\varphi_2(0,0)=0$), $\lambda_2$ represents an operating wavelength of the second light beam $L_2$, $\theta_2$ represents an angle between the X-axis and a projection of the second light beam $L_2$ on the X-Y plane, $\gamma_2$ represents an angle between the Z-axis and the second light beam $L_2$, $\Delta\varphi_3(x,y)$ represents a difference between a phase shift to be induced on the third light beam $L_3$ by the nanostructure 21 at coordinates (x,y) and a phase shift to be induced on the third light beam $L_3$ by the nanostructure 21 at the origin (0,0) for the third light beam $L_3$ (thus, $\Delta\varphi_3(0,0)=0$), $\lambda_3$ represents an operating wavelength of the third light beam $L_3$, $\theta_3$ represents an angle between the X-axis and a projection of the third light beam $L_3$ on the X-Y plane, and $\gamma_3$ represents an angle between the Z-axis and the third light beam $L_3$.

In this embodiment, each nanostructure 21 is a nanometer-scaled rectangular column that has a rectangular X-Y cross section (i.e., a cross-section lying on the X-Y plane), and that is made of $TiO_2$. In some embodiments, each of the nanostructures 21 has a length (i.e., the length of the rectangular X-Y cross section) ranging from $$\frac{\lambda_n}{30}$$

to $\lambda_n$, a width (i.e., the width of the rectangular X-Y cross section) ranging from $$\frac{\lambda_n}{30}$$

to $\lambda_n$, and a height (measured in the Z-axis direction) ranging from $$\frac{\lambda_n}{100}$$

to $2\lambda_n$. In the case that the nanostructures 21 have the X-Y cross sections in other shapes, side lengths thereof may have a similar scale. If the dimensions of the nanostructure 21 fall outside of the above ranges, the nanostructure 21 may have a lower output efficiency.

In some variations of this embodiment, each nanostructure 21 may be a nanometer-scaled column that has the X-Y cross section of a square, a circle or other types of polygon (e.g., a triangle, a pentagon, a hexagon, etc.), and may either be a solid column or a hollow column, as long as it is configured to satisfy equation (1).

Table 1 exemplarily shows some relationships between dimensions of a nanostructure 21 and a phase shift to be induced on a light beam by the nanostructure 21, where the x-polarization phase shift refers to a polarization phase shift in the X-axis direction of the nanostructure 21, and the y-polarization phase shift refers to polarization phase shift in the Y-axis direction of the nanostructure 21. The relationships may be related to the material of the substrate 1, the material of the meta-optical array 2, the shape of the X-Y cross section of the nanostructure 21, the height, the array period (i.e., a distance between centers of adjacent nanostructures 21, which may range, for example but not limited to, from $$\frac{\lambda_n}{30}$$

to $\lambda_n$), and the structure (e.g., solid or hollow) of the nanostructure 21, etc. In this embodiment, the substrate 11 is made of $SiO_2$, the array period is 210 nm, and the nanostructures 21 are made of $TiO_2$, and have the same height of 750 nm for ease of manufacturing. However, it is not necessary for the nanostructures 21 to have the same height in other embodiments.

TABLE 1

| Nanostructure | x-width (nm) | y-width (nm) | x-polarization phase shift (degree) | y-polarization phase shift (degree) |
|---|---|---|---|---|
| Nanostructure for 1st light beam $L_1$ (operating wavelength: 640 nm) | 50 | 50 | 17.7 | 17.7 |
| | 50 | 100 | 34.1 | 51.5 |
| | 50 | 150 | 45.5 | 106.3 |
| | 100 | 50 | 51.5 | 34.1 |
| | 100 | 100 | 97.1 | 97.1 |
| | 100 | 150 | 129.6 | 194.2 |
| Nanostructure for 2nd light beam $L_2$ (operating wavelength: 520 nm) | 50 | 50 | 24.9 | 24.9 |
| | 50 | 100 | 46.8 | 74.3 |
| | 50 | 150 | 61.9 | 159.6 |
| | 100 | 50 | 74.3 | 46.8 |
| | 100 | 100 | 146.5 | 146.5 |
| | 100 | 150 | 199.5 | 301.3 |
| Nanostructure for 3rd light beam $L_3$ (operating wavelength: 450 nm) | 50 | 50 | 33.6 | 33.6 |
| | 50 | 100 | 62.9 | 108.3 |
| | 50 | 150 | 82.9 | 242.0 |
| | 100 | 50 | 108.3 | 62.9 |
| | 100 | 100 | 226.2 | 226.2 |
| | 100 | 150 | 315.2 | 107.9 |

It is noted that this disclosure is not limited to the numbers listed in Table 1, and one skilled in the art would know how to determine the dimensions of the nanostructures for a desired phase shift.

In Table 1, the relationships between the phase shift and the nanostructure 21 are presented using the dimensions of the nanostructure 21 and the polarization phase shifts to be induced in an x-direction (i.e., the lengthwise direction of the nanostructure 21) and a y-direction (i.e., the widthwise direction of the nanostructure 21). In some embodiments, the Pancharatnam-Berry phase can be used to define the phase shift for left-handed circularly polarized light and/or right-handed circularly polarized light, and the phase shift is related to not only geometric dimensions but also an orientation of the nanostructure 21.

The meta-optical device of the embodiment may be produced with the following steps.

In the first step, $\Delta\varphi_n(x,y)$ is calculated for each nanostructure 21 using equation (1), and dimensions of the nanostructure 21 at the origin (0,0) are determined, so the phase shift $\varphi_n(0,0)$ to be induced by the nanostructure 21 at the origin (0,0) is known. Then, the desired phase shift $\varphi_n(x,y)$ to be induced by each nanostructure 21 can be calculated by adding $\Delta\varphi_n(x,y)$ to $\varphi_n(0,0)$. Based on the desired phase shift $\varphi_n(x,y)$, dimensions of the corresponding nanostructure 21 can be determined, as exemplified in Table 1. For example, if the X-Y cross section of the nanostructure 21 at the origin of the meta-optical array 2 has a length of 50 nm and a width of 100 nm, $\varphi_1(0,0)$ would be 34.1° for the x-polarization and $\varphi_1(0,0)$ would be 51.5° for the y-polarization. In such a case, when $\Delta\varphi_1(x,y)$ calculated for a nanostructure 21 at a position (x,y) is 11.4 degrees, the desired phase shift $\varphi_1(X,y)$ of the nanostructure 21 can be calculated as being either 45.5 (=34.1+11.4) degrees for the x-polarization or 62.9 (=51.5+11.4) degrees for the y-polarization, depending on which direction the designer wishes the phase shift to occur in. Based on $\varphi_n(x,y)$, one skilled in the art can calculate the required dimensions of the nanostructure 21 based on the materials of the substrate 11 and the meta-optical array 2, the shape of the X-Y cross section of the nanostructure 21, and the structure of the nanostructure 21. In the abovementioned example, the nanostructure 21 can be configured to have a length of 50 nm, a width of 150 nm, an array period of 210 nm and a height of 750 nm to achieve the desired phase shift of $\varphi_1(x,y)=45.5°$ for the x-polarization according to Table 1.

In the second step, the substrate 1 that is made of S102 is prepared, and semiconductor manufacturing techniques are used to form the nanostructures 21 that are made of $TiO_2$ on the substrate surface 11 according to the dimensions of the nanostructures 21 obtained the first step, so as to create the meta-optical array 2 on the substrate 1. One skilled in the art should be familiar with such a semiconductor manufacturing process, so details thereof are omitted herein for the sake of brevity.

The performance of the embodiment is provided hereinafter. In the following simulation experiments, the meta-optical array 2 is configured to deflect collimated light beams $L_1$-$L_3$ onto the same position (a predetermined position) of the same plane (i.e., an imaging plane). After locations of light sources (not shown) that emit the collimated light beams $L_1$, $L_2$, $L_3$ are determined, corresponding angles $\theta_1$, $\gamma_1$, $\theta_2$, $\gamma_2$, $\theta_3$, $\gamma_3$ can be calculated to make the meta-optical device.

Figure 4:
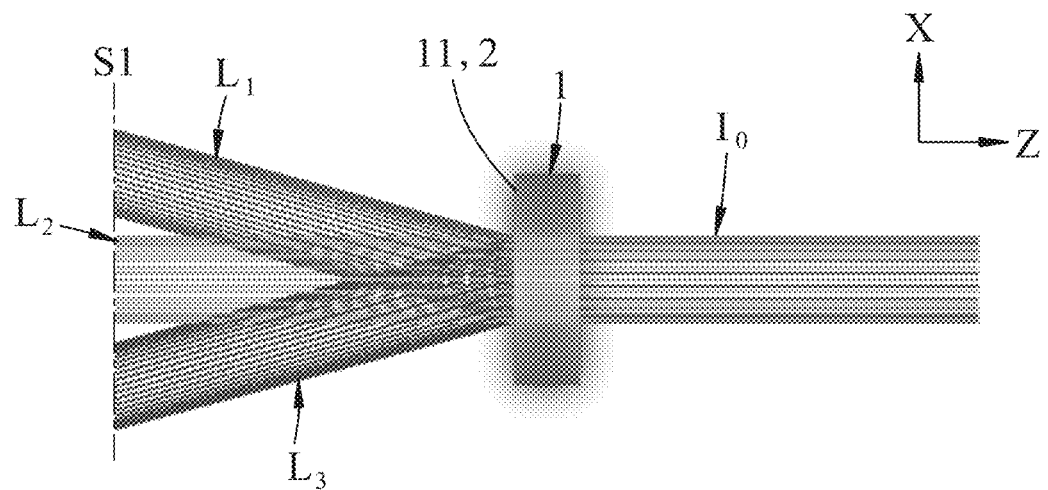
Figure 5:
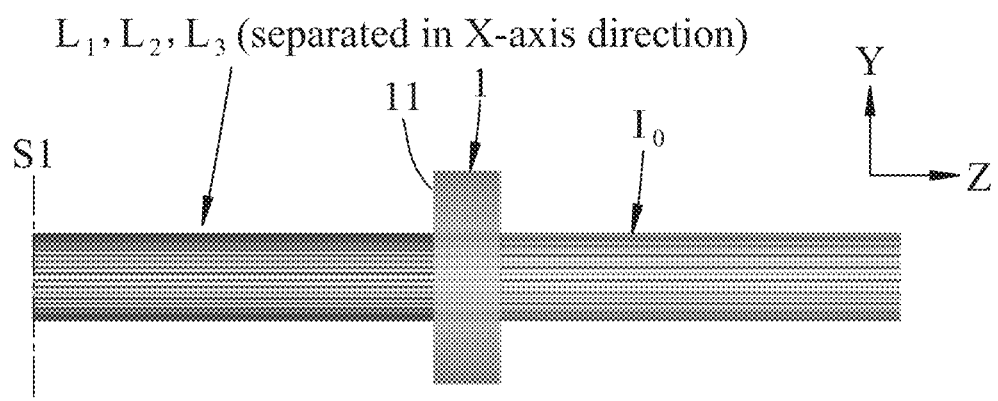

In the first simulation experiment, the meta-optical device of this embodiment is configured to nave the angle $\theta_1$ between a projection of the first light beam $L_1$ on the X-Y plane and the X-axis equal 0°, the angle $\gamma_1$ between the first light beam $L_1$ and the Z-axis equal 15°, the angle $\theta_2$ between a projection of the second light beam $L_2$ on the X-Y plane and the X-axis equal 0°, the angle $\gamma_2$ between the second light beam $L_2$ and the Z-axis equal 0°, the angle $\theta_3$ between the a projection of third light beam $L_3$ on the X-Y plane and the X-axis equal 180°, and the angle $\gamma_3$ between the third light beam $L_3$ and the Z-axis equal 15°. Deflected first, second and third light beams are collimated light beams that coincide and travel in the same direction (a predetermined direction) to form a collimated imaging light beam $I_0$, as shown in FIGS. 4 and 5.

Figure 7:
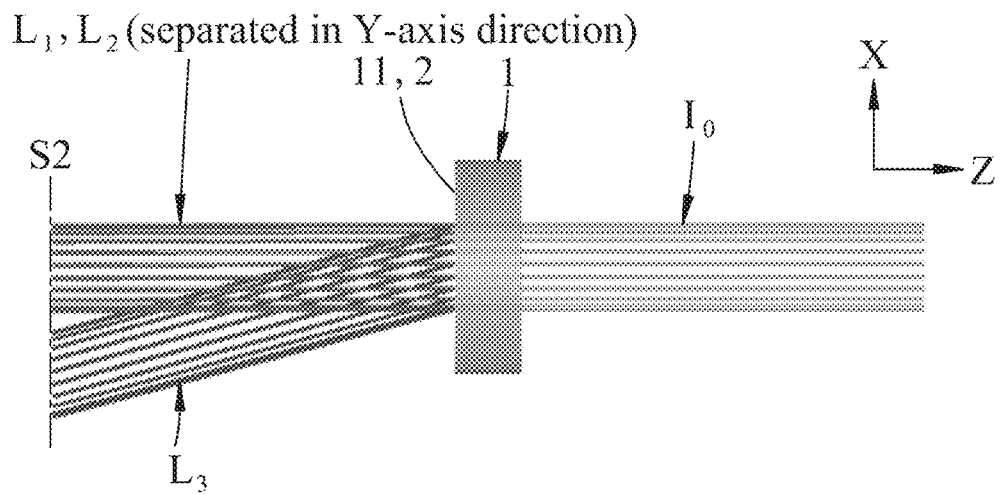
Figure 8:
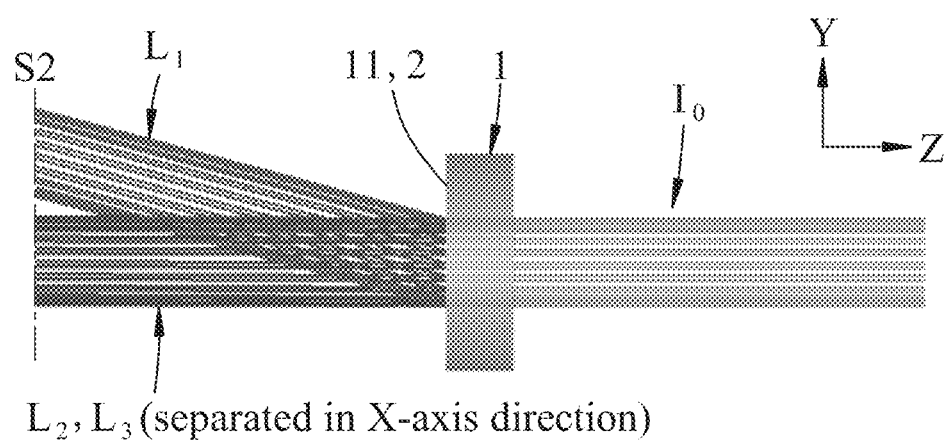

In the second simulation experiment, the meta-optical device of this embodiment is configured to have the angle $\theta_1$ between a projection of the first light beam $L_1$ on the X-Y plane and the X-axis equal 90°, the angle $\gamma_1$ between the first light beam $L_1$ and the Z-axis equal 15°, the angle $\theta_2$ between a projection of the second light beam $L_2$ on the X-Y plane and the X-axis equal 0°, the angle $\gamma_2$ between the second light beam $L_2$ and the Z-axis equal 0°, the angle $\theta_3$ between a projection of the third light beam L; on the X-Y plane and the X-axis equal 180°, and the angle $\gamma_3$ between the third light beam $L_3$ and the Z-axis equal 15°. Deflected first, second and third light beams are collimated light beams that coincide and travel in the same direction (a predetermined direction) to form a collimated imaging light beam as shown in FIGS. 7 and 8.

In the third simulation experiment, the meta-optical device of this embodiment is configured to have the angle $\theta_1$ between a projection of the first light beam $L_1$ on the X-Y plane and the X-axis equal 90', the angle $\gamma_1$ between the first light beam $L_1$ and the Z-axis equal 15°, the angle $\theta_2$ between a projection of the second light beam $L_2$ on the X-Y plane and the X-axis equal 0°, the angle $\gamma_2$ between the second light beam $L_2$ and the Z-axis equal 0°, the angle $\theta_3$ between a projection of the third light beam $L_3$ on the X-Y plane and the X-axis equal 270° (or −90°), and the angle n between the third light beam $L_3$ and the Z-axis equal 15°. Deflected first, second and third light beams are collimated light beams that coincide and travel in the same direction (a predetermined direction) to form a collimated imaging light beam as shown in FIGS. 10 and 11.

Table 2 lists operating wavelengths of the light beams $L_1$, $L_1$, $L_3$ used in these simulation experiments.

TABLE 2

| | |
|---|---|
| Operating wavelength $\lambda_1$ of $1^{st}$ light beam $L_1$ | 640 nm (red light) |
| Operating wavelength $\lambda_2$ of $2^{nd}$ light beam $L_2$ | 520 nm (green light) |
| Operating wavelength $\lambda_3$ of $3^{rd}$ light beam $L_3$ | 450 nm (blue light) |

Figure 3:
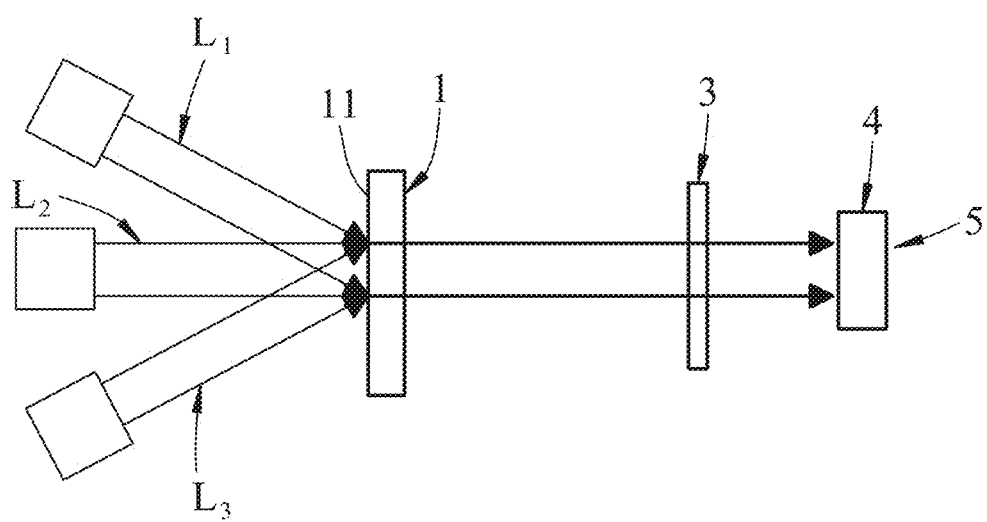
FIG. 3 is a schematic diagram illustrating an optical measurement system used to measure deflected light beams outputted by the embodiment.

In these simulation experiments, distribution of intensity of the deflected first, second and third light beams can be measured using an optical measurement system that may include a polarizer 3, a wavefront sensor 4 and a laser beam profiler 5, as shown in FIG. 3. The wavefront sensor 4 can be used to measure wavefront errors of the deflected collimated light beams (each being a combination of the deflected light beam components that respectively result from the nanostructures 21 of the meta-optical array 2 deflecting a respective one of the first, second and third light beams $L_1$, $L_2$, $L_3$) that pass through the polarizer 3 to acquire quality of collimation, and the laser beam profiler 5 can be used to precisely measure angular errors of the deflected light beams that pass through the polarizer 3. Details of measurement can be derived by one skilled in the art from the above descriptions, and are thus omitted herein for the sake of brevity.

Table 3 lists correspondences between the drawings and experimental conditions of the first to third simulation experiments.

TABLE 3

| | Experiment 1 | Experiment 2 | Experiment 3 |
|---|---|---|---|
| Optical paths of light beams | FIG. 4 FIG. 5 | FIG. 7 FIG. 8 | FIG. 10 FIG. 11 |
| Footprint of incident light beams on plane S1/S2/S3 | FIG. 6 | FIG. 9 | FIG. 12 |

FIGS. 6, 9 and 12 respectively correspond to the first, second and third simulation experiments, and each show a footprint of incident Might beams (i.e., the first, second and third light beams $L_1$, $L_2$, $L_3$) on a plane S1 (see FIGS. 4 and 5 for the first simulation experiment), S2 (see FIGS. 7 and 8 for the second simulation experiment) or S3 (see FIGS. 10 and 11 for the third simulation experiment). In each of FIGS. 6, 9 and 12, the first, second and third light beams $L_1$, $L_2$, $L_3$ are separate light beams that travel in different directions before passing through the meta-optical device of the corresponding simulation experiment, but they are combined together and travel in the same direction after passing through the meta-optical device of the corresponding simulation experiment, proving that the meta-optical device that satisfies equation (1) can deflect the first, second and third light beams $L_1$, $L_2$, $L_3$ in such a way that the deflected first, second and third light beams are combined together and travel in the same direction, thereby forming a single imaging light beam $I_0$.

To sum up, the meta-optical device of the embodiment according to this disclosure uses the meta-optical array that includes the nanostructures 21 to induce the desired optical effect, i.e., deflecting the incident light beam such that the deflected light beam travels in a predetermined direction, while the overall size of the meta-optical device can still be small in comparison to traditional optical systems. The meta-optical device of the embodiment according to this disclosure can also be configured to deflect multiple light beams (e.g., light beams of different colors), such that the deflected light beams are combined together and travel in the same direction. In addition, the meta-optical device of the embodiment according to this disclosure can be made using a mature semiconductor manufacturing process, so the processing difficulty is low and the processing precision is high.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A meta-optical device for light beam combining, comprising:
   a substrate having a substrate surface that extends in an X-Y plane defined by an X-axis extending in an X-axis direction and a x-axis extending in a Y-axis direction, wherein the X-axis direction and the Y-axis direction are perpendicular to each other; and
   a meta-optical array that is formed on said substrate surface and that is disposed to receive first to $N^{th}$ light beams, wherein each of the first to $N^{th}$ light beams is a collimated light beam, N is a positive integer, and said meta-optical array includes a plurality of nanostructures that are arranged in an array and that extend in a Z-axis direction in which a Z-axis extends and which is perpendicular to said substrate surface;
   wherein each of said nanostructures is configured to satisfy an equation of:

$$\Delta\varphi_n(x, y) = \frac{2\pi}{\lambda_n}(x\cos\theta_n + y\sin\theta_n)\sin\gamma_n,$$

where n is a variable that takes on a positive integer value ranging from 1 to N, x represents a distance between said nanostructure and an origin of said meta-optical array for an $n^{th}$ light beam in the X-axis direction, $\gamma$ represents a distance between said nanostructure and the origin of said meta-optical array for the $n^{th}$ light beam in the Y-axis direction, the origin of said meta-optical array for the $n^{th}$ light beam is defined to be an intersection of an optical axis of the $n^{th}$ light beam and said meta-optical array, $\Delta\varphi_n(x,y)$ represents a difference between a phase shift to be induced on the $n^{th}$ light beam by said nanostructure and a phase shift to be induced on the $n^{th}$ light beam by one of said nanostructures that is located at the origin of said meta-optical array for the $n^{th}$ light bears, $\lambda_n$ represents an operating wavelength of the $n^{th}$ light beam, $\theta_n$ represents an angle between the X-axis and a projection of the $n^{th}$ light beam on the X-Y plane, and $\gamma_n$ represents an angle between the Z-axis and the $n^{th}$ light beam; and
   wherein the $n^{th}$ light beam thus deflected by said meta-optical array travels in a Predetermined detection.

2. The meta-optical device of claim 1, wherein each of said nanostructures has, for each value of n, a height ranging from $$\frac{\lambda_n}{100}$$

to $2\lambda_n$ in the Z-axis direction, and a rectangular cross section lying on the X-Y plane;
   wherein said rectangular cross section has a length ranging from $$\frac{\lambda_n}{30}$$

to $\lambda_n$, and a width ranging from $$\frac{\lambda_n}{30}$$

to $\lambda_n$.

3. The meta-optical device of claim 1, being a lens component to be disposed in an optical engine of a projector.

4. The meta-optical device of claim 1, wherein N is not smaller than two.

5. The meta-optical device of claim 4, wherein said meta-optical array deflects the first to $N^{th}$ light beams to output deflected first to $N^{th}$ light beams that travel in the same predetermined direction.

6. The meta-optical device of claim 5, wherein the deflected first to $N^{th}$ light beams coincide.

7. The meta-optical device of claim 4, wherein N=3.

* * * * *